Jan. 13, 1953        J. A. JULIAN        2,625,095
APPARATUS FOR TREATING FOOD PRODUCTS
Filed Oct. 19, 1949        4 Sheets-Sheet 1
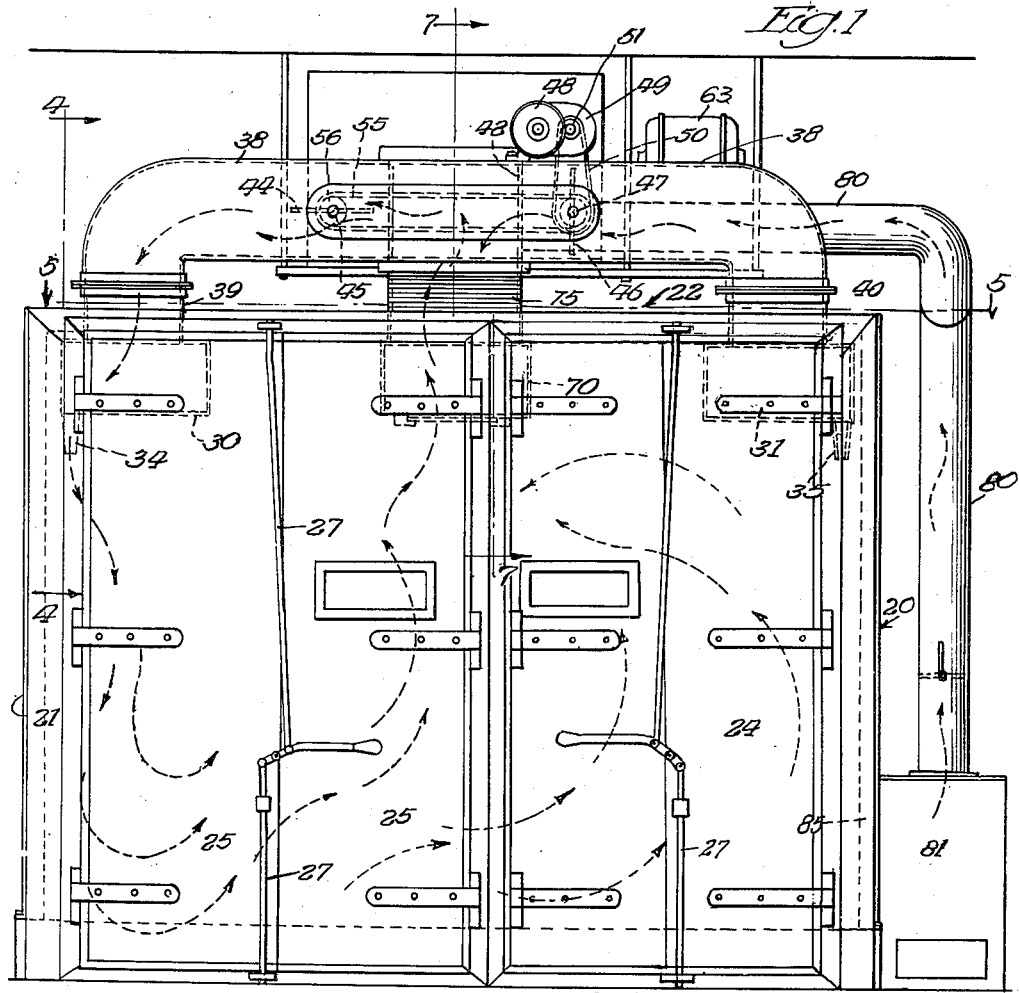
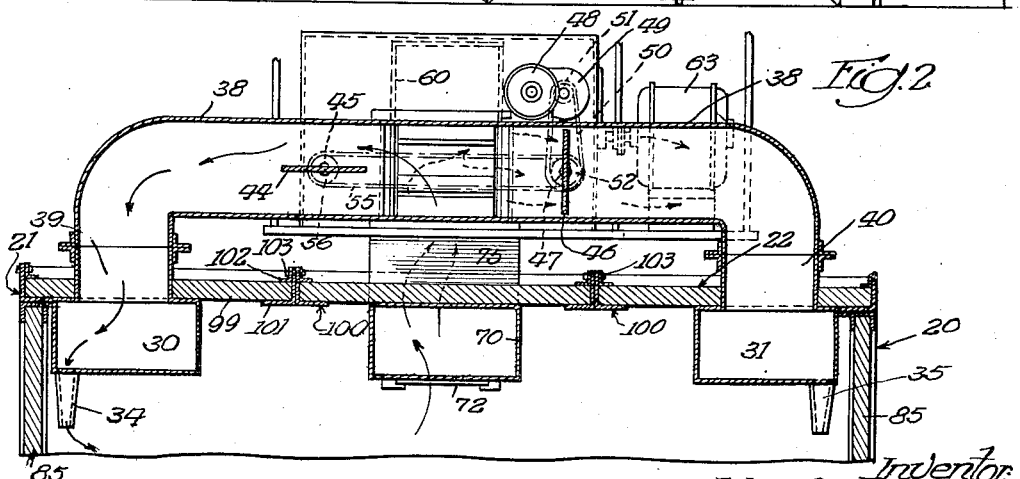
Inventor:
John A. Julian
By Fred Gerlach
his Atty

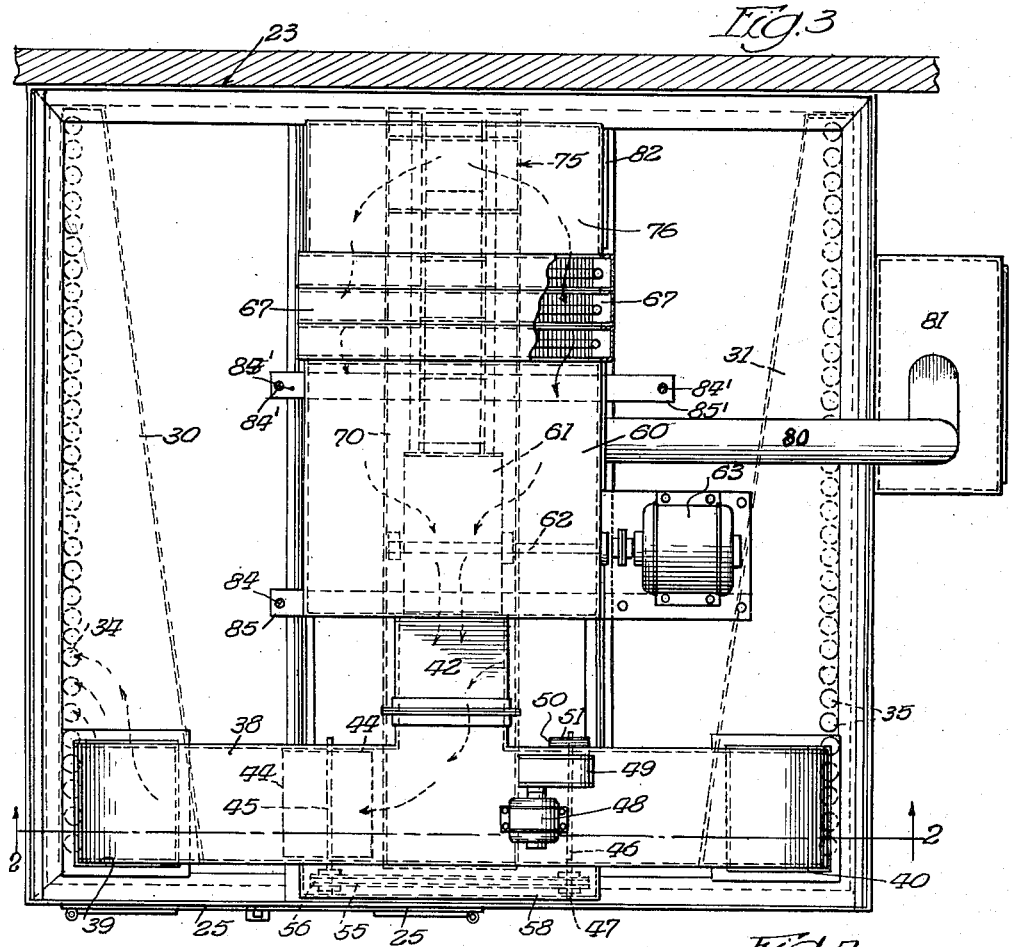
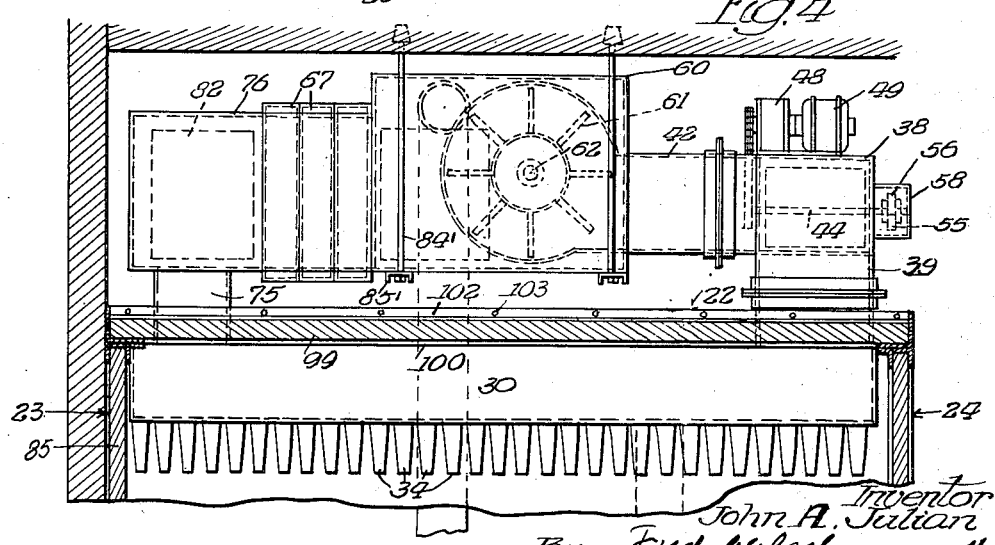

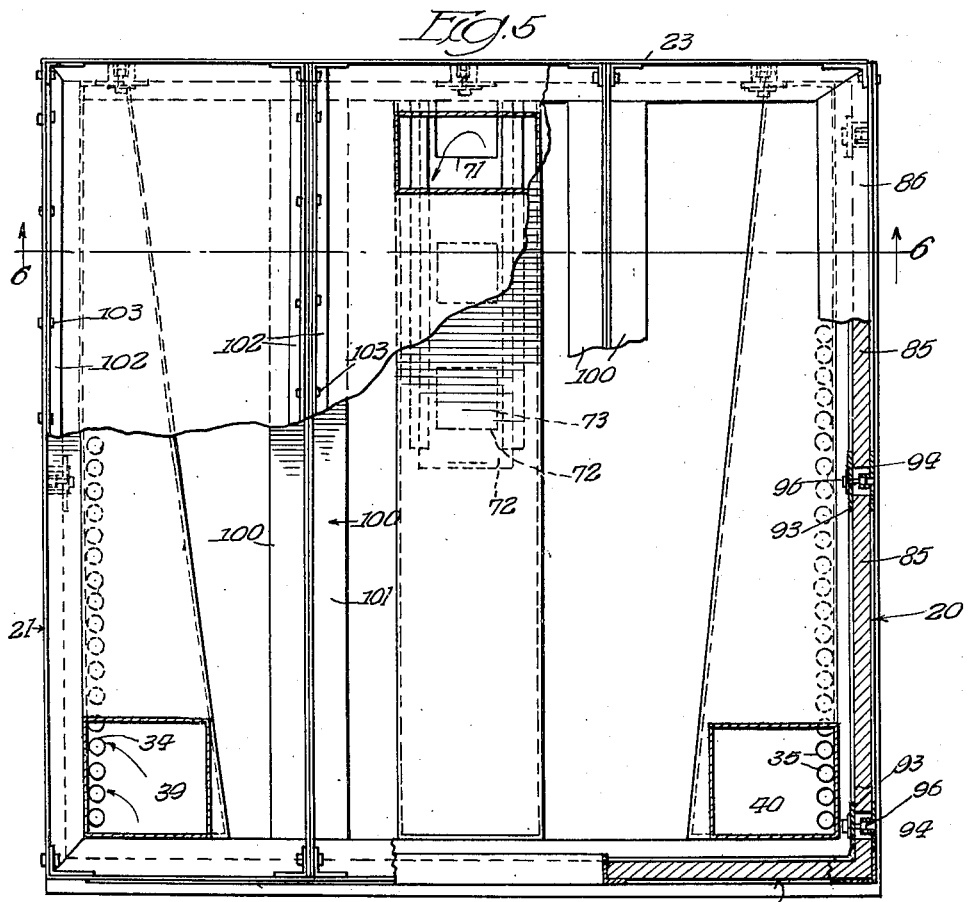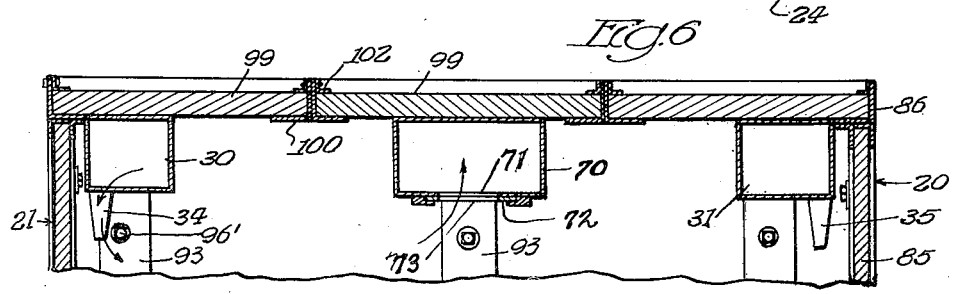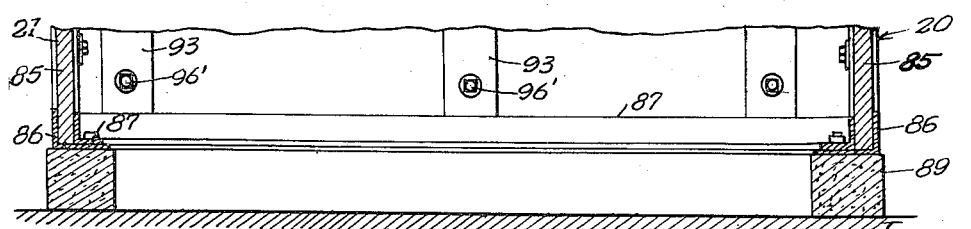

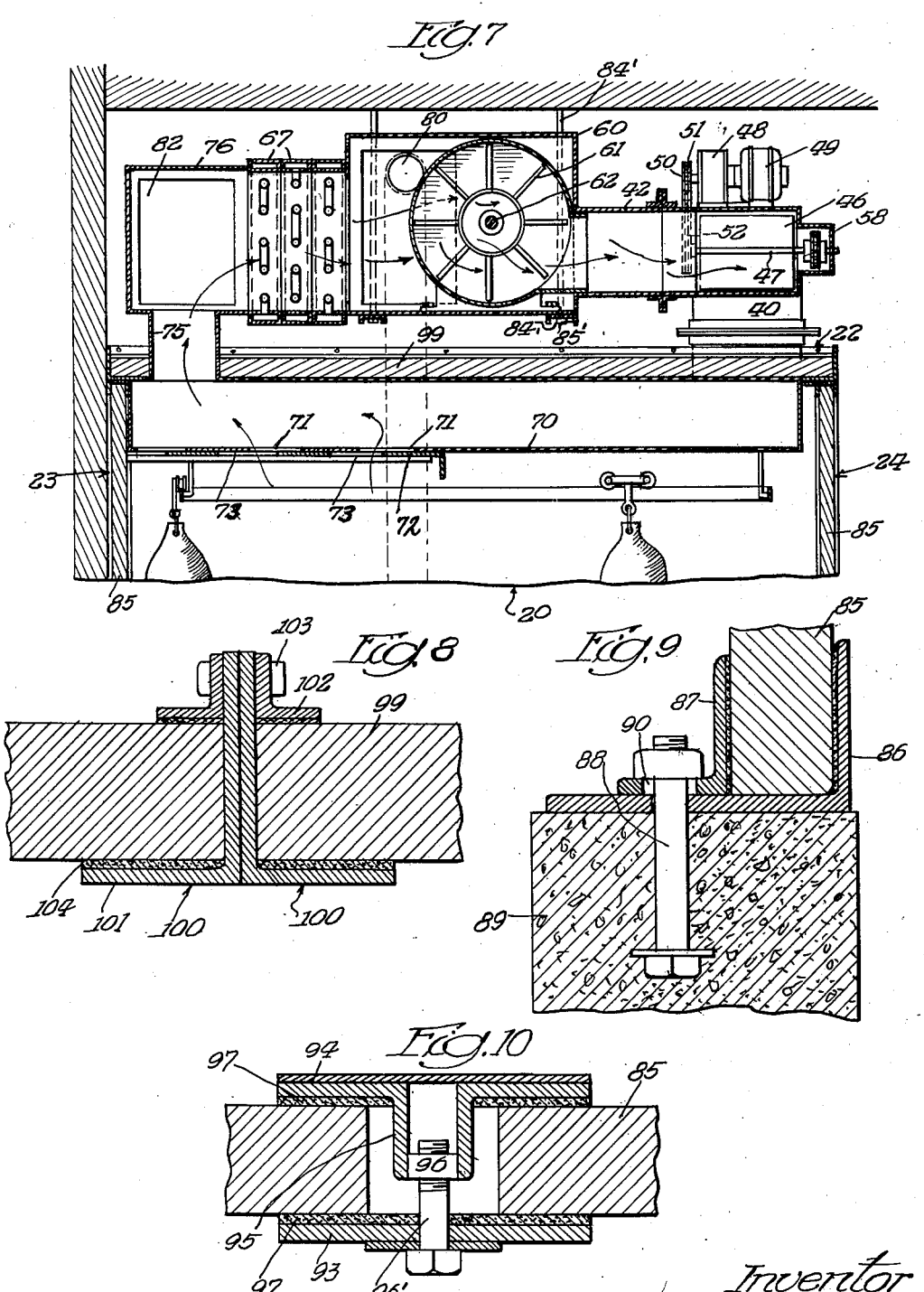

Patented Jan. 13, 1953

2,625,095

UNITED STATES PATENT OFFICE 2,625,095

APPARATUS FOR TREATING FOOD PRODUCTS

John A. Julian, Chicago, Ill.

Application October 19, 1949, Serial No. 122,261

2 Claims. (Cl. 99—259)

The invention relates to apparatus for curing or treating food products. In curing and preserving food products a desideratum is to treat the products with smoke or a gaseous curing fluid so that all portions of the products will be intimately contacted by the smoke or fluid and uniformly cured or treated throughout.

One object of the invention is to provide simple and efficient apparatus for alternately forcing the gaseous fluid to rows of jets at opposite sides of the products into contact with the products in relatively and constantly varying pressures and volume to cause the smoke or fluid to permeate all portions of the products and effect a uniform cure or treatment thereof.

Another object of the invention is to provide improved apparatus for curing food products which is simple in construction and efficient in operation.

Other objects of the invention will appear from the detailed description.

The invention consists in the several novel features hereinafter described and more particularly defined by claims at the conclusion hereof.

In the drawings:

Fig. 1 is a front elevation of an apparatus embodying the invention;

Fig. 2 is a section taken on line 2—2 of Fig. 3;

Fig. 3 is a plan view, parts being broken away;

Fig. 4 is a section taken on line 4—4 of Fig. 1;

Fig. 5 is a section taken on line 5—5 of Fig. 1, parts being broken away;

Fig. 6 is a section taken on line 6—6 of Fig. 5, a portion of the house being broken away;

Fig. 7 is a section taken on line 7—7 of Fig. 1;

Fig. 8 is a detailed section illustrating one of the joints between the panels of the roof;

Fig. 9 is a section illustrating one of the joints between a side panel and the base of the house; and Fig. 10 is a detailed section illustrating one of the joints between the side and back panels of the house.

The invention is exemplified in a house which provides a chamber in which the food products are suspended in any suitable manner, as well understood in the art, for curing or treatment. The house comprises side walls, generally designated 20, 21, a back wall, generally designated 23 and a front comprising a fixed panel 24 and a pair of hinged doors 25 for access to the curing chamber in the house. During the operation of the apparatus, the doors are usually locked in closed position by bolts 27 connected to an operating handle 28. The house is rectangular in contour. A conduit 30 is provided in the upper corner at one side of the chamber in the house, and at its opposite side a conduit 31 is provided. These conduits are stationarily secured in the house and are rearwardly convergent in cross-sectional area, for equalized discharge of fluid from the spouts in each conduit. Conduit 30 is provided adjacent one of the side walls 21 with a series of downwardly discharging spouts 34, and conduit 31 is provided with a similar series of downwardly discharging spouts 35. A trunk 38 for delivering smoke or gaseous fluid is supported above the roof of the house and has its opposite ends connected by pipe sections 39 and 40 to the front and enlarged ends of conduits 30, 31, respectively, so that smoke or fluid for the treatment of the food products will be delivered to the conduits 30, 31 at the opposite upper corners of the chamber in the house and discharged downward through spouts 34 and 35. A conduit section 42 rectangular in cross-section is communicatively connected with trunk 38 for delivery of smoke or fluid into the central portion of the trunk 38.

At one side of the conduit section 42 trunk 38 is provided with a butterfly valve 44 on a shaft 45, which extends across the duct in trunk 38 and is journalled in the front and back walls of said trunk. At the opposite side of conduit section 42 the trunk is provided with a butterfly valve 46 which is mounted on a shaft 47 which is journalled in the front and rear walls of trunk 38. Valve 44 controls the flow of fluid from inlet 42 to the conduit 30 at one side of the house and valve 46 controls the flow of fluid from inlet conduit section 42 to the conduit 31 at the opposite side. Valves 44 and 46 are continuously rotated to constantly and relatively vary the flow of fluid from inlet conduit section 42 to the conduits 30, 31, respectively. The shafts 45, 47 are mounted to rotate on parallel axes. The mechanism for continuously rotating the valves 44, 46 comprises an electric motor 48, a reduction gear 49 driven by the motor, a sprocket chain 50 driven by a sprocket 51 on the output shaft of the reduction gearing, a sprocket wheel 52 on shaft 47 of valve 46, a second sprocket 54 on shaft 47, a sprocket chain 55 driven by sprocket 54 and a sprocket wheel 56 on shaft 45 which is driven by chain 55. A chain-guard 58 encloses the chain 55 and the sprocket wheels 52 and 54. This exemplifies mechanism for continuously rotating valves 44, 46 in predetermined angular relation for controlling the delivery of fluid under pressure to conduits 30, 31, respectively. A characteristic of valves 44, 46 is that they are angularly correlatively positioned on shafts 45 and 47, to gradually increase and decrease the flow of fluid alternately to conduits 30, 31 and to control the fluid so that during the maximum opening of valve 44 the flow of fluid to conduit 30 will be at the maximum, and valve 46 will be positioned for the minimum flow to conduit 31. For this purpose valves 44 and 46 operate at right angles to each other, which causes gradual volumetric increase of flow to one of said conduits during the gradual diminution of the volumetric flow past valve 46 to the other of said conduits and diminution of flow past valve 44 to conduit 30 during the increase of flow past valve 46 to conduit 31. Valves 44 and 46 are provided with clearance which prevent the flow to conduits 30 and 31 from being completely cut off at any time, so that during maximum flow past one valve there will be a slight flow past the other valve. As a result of this construction the flow of fluid from inlet section 42 and and the central portion of trunk 38, when valve 44 is positioned as illustrated in Fig. 2, will be at its maximum and the flow past valve 46 to conduits 31 will be at its minimum. The continuous rotation of valves 44 and 46 will produce constant fluctuations in the relative volumetric flow to the conduits 30, 31, to alternately discharge the maximum volume into one of the conduits and the minimum volume into the other of said conduits, with the volumetric flow gradually and relatively increasing and decreasing between the maximum and minimum flow.

The apparatus comprises a blower which includes a casing 60 and an impeller 61 on a shaft 62 which is driven by an electric motor 63. The outlet from casing 60 is communicatively connected to the conduit section 42 for delivering fluid under pressure into the central portion of trunk 38. The inlet of casing 60 is connected to draw air through a series of heat exchange coils 67. An outlet conduit 70, rectangular in cross-section, is secured on the under side of the roof of the house, and its bottom is provided with openings 71 and a valve 72 slidably mounted on said bottom and provided with openings 73 whereby the outflow of fluid from the curing chamber in the house can be regulated. The rear end of conduit 70 is connected by conduit section 75 to a box 76 which communicates with the heat transfer coils 67. The blower draws air from the curing chamber in the house via openings 73 in valve 72, openings 71 in the bottom of conduit 70, conduit section 75, box 76 and coils 67 and recirculates the fluid through trunk 38 under control of valves 44, 46. When the curing of the food is to be effected with smoke, the smoke is drawn into conduit section 42 through a flue 80 from a smoke-generator 81 of any suitable character. A door 82 is adapted to admit air to box 76 to the fluid being circulated by the blower. The blower housing 60 may be supported from a ceiling by hangers 84 and channel bars 85.

The operation of the apparatus will be as follows: Motor 63 and motor 48 will be continuously operated. When the products in the curing chamber are to be treated with smoke the blower will draw air from the curing chamber under regulation of valve 72 and draw smoke from flue 80 and force the fluid through conduit section 48 into the central portion of trunk 38 from which the smoke-laden air will be delivered to conduits 30, 31 at the top of and opposite sides of the curing chamber under control of valves 44 and 46. From conduits 30 and 31 the fluid will be projected in streams through spouts 34, 35, respectively, downwardly in the curing chamber. Valves 44, 46 will be continuously rotated in relatively right-angled relation. This will cause the relative volumetric flow alternately to conduits 30, 31 to be constantly increased and decreased within predetermined limits and variations in the pressures at which the fluid is discharged from spouts 34 and 35. For example, when the valves are positioned as illustrated in Fig. 2, the volumetric flow past valve 44 to conduit 30 and spouts 34 will be at its maximum and produce a high degree of pressure in the fluid discharged from spouts 34 which will cause the fluid to be projected downwardly and flow crosswise of the curing chamber in distance and degree corresponding to the pressure, while at the same time there will be a minimum volumetric flow past valve 46 into conduit 31 for discharge through spouts 35. This relative change and alternation in flow as the result of the continuous rotation of the valves causes the fluid at high pressure to intimately contact one of the sides of the food products in the curing chamber and the volumetric flow and pressure of the fluid at that side of the food products will gradually decrease while the valve 46 will cause the volumetric flow and pressure of fluid to conduit 31 and spouts 35 to be gradually increased until such valve 46 is positioned for the maximum flow, at which time the fluid from spouts 35 will be forced with high pressure into intimate contact with the opposite sides of the food products. These constant changes of relative pressures of the fluid delivered alternately into opposite sides of the curing chamber will cause the fluid to move laterally and a uniform and thorough permeation or curing of the products.

The apparatus may be used for treating food products with refrigerated air. For this purpose a refrigerant is passed through the heat transfer coils 67 and the smoke flue 80 is closed.

In the operation of the apparatus with high and constantly varying pressures it is desirable to provide a house with insulated walls which effectively seal the curing chamber in the house. The side walls and the roof of the house are sectional construction. The side walls are built up of upright panels 85, the lower ends of which are confined between an outer angle-bar 86, and an inner angle-bar 87 between the vertical flanges of which each panel 85 is secured, and bolts 88 which are anchored in the concrete curb 89 and extend through the horizontal flange of angle-bar 86 and through a slot 90 in the horizontal flange of angle-bar 87. The panel is tightly confined between the vertical flanges of bars 86, 87 and slots 90 permit said flanges to be adjusted into closed relation with the panel, as illustrated in Fig. 9. The joints between the side margins of panels 85, as illustrated in Fig. 10, comprise an inner clamping plate 93 and a pair of angle-bars 94 having inwardly extending flanges 95 which are rigidly secured together by nuts 96 which are welded to the confronting faces of said flanges and screw 96' which extend through clamping plates 93 and are threaded into nuts 96. Sealing strips 97 are interposed between the panels and plate 93 and between the panels and the side flanges of angle-bars 94. The roof is formed of panels 99, the margins of which are confined between the inner flanges 101 of angle-bars 100 and the outer angle-bars 102 the side flanges of which abut against the upper face of panels 99 and bolts 103 which extend through slots in upwardly projecting flanges of angle-bars 101 and 102. Sealing strips 104 are interposed between the flanges 101 and the under side of panels 99. The panels forming the side walls and the roof are formed of any suitable material. This provides a sectional house construction which can be readily assembled and sealed.

The invention exemplifies apparatus for treating or curing food products in which the fluid for treating the products in the curing chamber is continuously fluctuated to relatively vary the pressure of the fluid in opposite sides of the curing chamber for producing constant movement of the back and forth flow of the fluid, which results in treating or curing the products evenly and uniformly. The mechanism for effecting these fluctuations is simple in construction and efficient in operation.

The invention is not to be understood as restricted to the details set forth since these may be modified within the scope of the appended claims without departing from the spirit and scope of the invention.

Having thus described my invention, what I claim as new and desire to secure by Letters Patent is:

1. Apparatus of the character described comprising: a housing provided with a chamber for enclosing food products to be treated, and including front, rear, top and side walls; conduits of like capacity at opposite sides of and at the top of the chamber provided with means for discharging fluid downwardly into the upper portions of the chamber; a trunk outside and extending crosswise of the house, having a straight portion with its ends communicatively connected to deliver fluid into said conduits, respectively, and provided with an inlet disposed midway between the conduits, an impeller for fluid disposed centrally over the top of the house and aligned rearwardly with and connected to the inlet; a pair of like rotary valves arranged in longitudinal alignment with the straight portion of the trunk, disposed on opposite sides of the inlet and equidistantly spaced from the conduits, for separately controlling the flow of fluid to the conduits, respectively; said valves being rotatively corelated to continuously and progressively increase and decrease the volumetric flow from the trunk in equal ratios alternately to said side conduits and the sides of the chamber; mechanism for simultaneously rotating the valves to produce said alternating flow from the trunk to the conduits at the opposite side of the chamber; an outlet conduit centrally disposed in the top of the chamber; and a heater between the rear end of the outlet conduit and the impeller, said inlet, impeller, and heater being substantially aligned fore and aft over the top of the house and vertically aligned with the outlet-conduit in the house.

2. Apparatus of the character described comprising: a housing provided with a chamber for enclosing food products to be treated, and including front, rear, top and side walls; conduits of like capacity at opposite sides of and at the top of the chamber provided with means for discharging fluid downwardly into the upper portions of the chamber; a trunk outside and extending crosswise of the house, having a straight portion with its ends communicatively connected to deliver fluid into said conduits, respectively, and provided with an inlet disposed midway between the conduits, an impeller for fluid disposed centrally over the top of the house and aligned rearwardly with and connected to the inlet, a pair of like rotary valves arranged in longitudinal alignment with the straight portion of the trunk disposed on opposite sides of the inlet and equidistantly spaced from the conduits, for separately controlling the flow of the fluid to the conduits, respectively; said valves being rotatively corelated to continuously and progressively increase and decrease the volumetric flow from the trunk in equal ratios alternately to said side conduits and the sides of the chamber; a motor connected to rotate the valve on one side of the inlet; an endless element disposed outside of the trunk for rotating the other valve from said motor driven valve, for simultaneously rotating the valves for producing said alternating flow from the trunk and in equal ratios alternately to said side conduits and the opposite sides of the products; an outlet conduit centrally disposed in the top of the chamber; and a heater between the rear end of the outlet conduit and the impeller, said inlet, impeller and heater being substantially aligned fore and aft over the top of the house and vertically aligned with the outlet conduit in the house.

JOHN A. JULIAN.

REFERENCES CITED

The following references are of record in the file of this patent:

UNITED STATES PATENTS

| Number | Name | Date |
| --- | --- | --- |
| 2,310,222 | Deverall | Feb. 9, 1943 |
| 2,312,339 | Jones | Mar. 2, 1943 |
| 2,352,590 | Trinkle | June 27, 1944 |
| 2,380,428 | Gilliam | July 31, 1945 |
| 2,505,973 | Julian | May 2, 1950 |
| 2,510,524 | Schramm | June 6, 1950 |